(12) United States Patent
Bernstein

(10) Patent No.: US 7,301,940 B1
(45) Date of Patent: *Nov. 27, 2007

(54) DUAL-USE PACKET/ANALOG PHONE OR PHONE-ADAPTER IN A PACKET TELEPHONY DISTRIBUTION SYSTEM

(75) Inventor: Jeffrey G. Bernstein, Middleton, MA (US)

(73) Assignee: 2Wire, Inc., San Jose, CA (US)

( * ) Notice: Subject to any disclaimer, the term of this patent is extended or adjusted under 35 U.S.C. 154(b) by 1035 days.

This patent is subject to a terminal disclaimer.

(21) Appl. No.: 10/199,847

(22) Filed: Jul. 18, 2002

Related U.S. Application Data

(60) Provisional application No. 60/306,474, filed on Jul. 18, 2001, provisional application No. 60/306,473, filed on Jul. 18, 2001.

(51) Int. Cl.
*H04L 12/66* (2006.01)
(52) U.S. Cl. ............... 370/356; 370/352; 370/355; 379/177; 379/156; 379/88.17
(58) Field of Classification Search ........... 370/466, 370/467, 352, 353, 401, 355, 356; 379/399.01, 379/156, 177, 88.17
See application file for complete search history.

(56) References Cited

U.S. PATENT DOCUMENTS

| 4,821,319 | A | 4/1989 | Middleton et al. |
| 5,117,451 | A | 5/1992 | Ladd et al. |
| 5,283,825 | A | 2/1994 | Druckman et al. |
| 5,623,537 | A | 4/1997 | Ensor et al. |
| 5,903,572 | A | 5/1999 | Wright et al. |
| 6,061,438 | A | 5/2000 | Shen et al. |
| 6,167,043 | A | 12/2000 | Frantz |
| 6,215,799 | B1 | 4/2001 | Mitchell et al. |
| 6,230,130 | B1 | 5/2001 | Castello da Costa et al. |
| 6,263,061 | B1 | 7/2001 | Tanaka et al. |
| 6,310,940 | B1 | 10/2001 | Ratz |
| 6,345,047 | B1 | 2/2002 | Regnier |
| 6,526,581 | B1 | 2/2003 | Edson |

(Continued)

FOREIGN PATENT DOCUMENTS

| WO | WO 00/56071 | 9/2000 |
| WO | WO 01/09739 | 2/2001 |
| WO | PCT US02/23111 | 12/2002 |

*Primary Examiner*—Edan Orgad
*Assistant Examiner*—Chuong Ho
(74) *Attorney, Agent, or Firm*—Blakely Sokoloff Talyor & Zafman

(57) ABSTRACT

A system and method for communicating via a packet telephony distribution system is defined that includes a dual-use/analog phone or phone adapter. Any communication device incorporating the adapter can dynamically receive incoming calls and transmit outgoing calls over analog phone lines and over derived phone lines such as VoIP (Voice Over IP). When receiving or transmitting calls, the adapter and an associated gateway perform operations that enable simultaneous communication over the analog phone lines or derived phone lines from any combination of communication devices. In cooperation with the communication devices, the gateway further dynamically controls the incoming and outgoing calls over the analog phone lines and derived phone lines.

21 Claims, 8 Drawing Sheets

U.S. PATENT DOCUMENTS

| | | |
|---|---|---|
| 6,697,358 B2 | 2/2004 | Bernstein |
| 6,757,382 B1 * | 6/2004 | Wilkes et al. ......... 379/399.01 |
| 6,856,616 B1 * | 2/2005 | Schuster et al. ............ 370/352 |
| 6,944,151 B1 * | 9/2005 | Menard ...................... 370/353 |
| 7,124,335 B2 * | 10/2006 | Choi et al. .................. 714/712 |
| 2002/0006137 A1 * | 1/2002 | Rabenko et al. ............ 370/466 |

* cited by examiner

| PHONE NAME | ADDRESS | CALLER ID | TOD | DOW | ... |
|---|---|---|---|---|---|
| 530 | 540 | 550 | 560 | 570 | 580 |
|  |  |  |  |  |  |
|  |  |  |  |  |  |
|  |  |  |  |  |  |
| ⋮ | ⋮ | ⋮ | ⋮ | ⋮ | ⋮ |

DUAL-USE PACKET/ANALOG PHONE OR PHONE-ADAPTER IN A PACKET TELEPHONY DISTRIBUTION SYSTEM

CROSS-REFERENCE TO RELATED APPLICATIONS

This application is related to, and claims the benefit of, U.S. Provisional Patent Application No. 60/306,474, entitled "Dual-Use Packet/Analog Phone or Phone-Adapter in a Packet Telephony Distribution System," filed Jul. 18, 2001, and U.S. Provisional Patent Application No. 60/306,473, entitled "Emulation of Phone Extensions in a Packet Telephony Distribution System," filed Jul. 18, 2001. The subject matter of the related applications is hereby incorporated by reference.

BACKGROUND OF THE INVENTION

1. Field of the Invention

This invention relates generally to analog and digital communication in a packet telephony distribution system.

2. Description of the Background Art

Typical telephone (phone) wiring in a home or business supports the use of one or two independent phone lines. Some premises support more phone lines. To provide access to phone lines, typically, several phone line jacks are connected to phone lines throughout the home. Sometimes, each phone line jack may be connected to all of the available phone lines, which permits the use of multi-line phones. Alternatively, each phone line jack may be connected to only one phone line.

When a home has an insufficient number of phone lines, a homeowner can order additional phone lines from a service provider. If the in-home wiring to support the new phone lines is already wired to the appropriate room or rooms, then there is no required change to the in-home wiring to support the new phone lines. However, if there are more desired phone lines than the existing in-home wiring can support, or if a phone jack is not connected to the desired phone line, then changes must be made to the in-home wiring. Such in-home wiring changes, particularly those that involve running new wires through the walls of a home, typically require a skilled phone technician at a relatively significant expense to the homeowner. The expense associated with providing new in-home wiring must be reduced to make the addition of new phone lines economical.

While it is currently uncommon for a household to have more phone lines than can be supported by existing in-home wiring, recent technological advances permit service providers, such as phone companies, cable TV companies, and other competing organizations, to offer additional phone lines at a relatively low cost. These technological advances permit these companies to make use of existing in-home wires to carry more than one phone signal at a time and are commonly called "derived" phone lines. Derived phone lines make it significantly easier and less expensive to provide additional phone service.

One approach to avoid running new inside wiring when the number of phone lines required exceeds the capacity of the existing wiring and permitting a single in-home copper wire-pair to support more than one phone line, is via data networking technology. Packet data networks, such as Ethernet, are commonly used to share high-speed data information around a home. Packet data networks permit multiple devices to send and receive data on the same physical network by dividing data into discrete packets, and providing a means for the devices to negotiate which device may send data at a given time. While Ethernet networks require special wiring that few homes have installed, such as Cat5 (Category 5) copper cable, recent technological advances permit high-speed packet data networks to operate on existing in-home wires. Alternatively, a wireless high-speed packet data network obviates the need for in-home wiring.

An example of a new technology is phoneline networking, which permits packet data networking over a single wire-pair of existing in-home wiring. An industry standard for phone line networking is HomePNA (Home Phoneline Networking Alliance). HomePNA ensures that signals sharing a phone line with the POTS (Plain Old Telephone Service) line coexist and maximize throughput despite signaling constraints, such as attenuation and noise.

Another technology is powerline networking, which permits packet data networking over AC power lines in the home. An industry standard for powerline networking is HomePlug (HomePlug Powerline Alliance). HomePlug permits power outlets to provide a power source and also provide network ports for packet data networking. Since multiple power outlets are more common in a home than multiple phone line jacks, there is typically no need to install new in-home wiring.

Finally, wireless networking technology permits packet data networking with no wires at all and operates over distances that span the full length and breadth of most homes. Industry standards for wireless networking include IEEE 802.11 and HomeRF (Home Radio Frequency).

Technology also exists to permit a packet data network to carry phone signals. Such technologies include packet telephony protocols for transmitting and receiving digitized voice signals in addition to call-control signaling. One technology is Voice Over IP (Internet Protocol) or VoIP. A number of industry standards exist for VoIP, including ITU-T H.323, ITU-T H.248 (Megaco; Media Gateway Control Protocol), MGCP (Media Gateway Control Protocol), and SIP (Session Initiation Protocol). Other technologies exist for packet data transmission of phone signals that do not make use of the Internet Protocol, but make direct use of the underlying packet data networking mechanism.

By using packet telephony in conjunction with any of the networking technologies that operate wirelessly or use existing in-home wiring, it is possible to distribute many phone lines throughout the home without installing new wires, avoiding the associated labor and cost. While all of the phones are connected to the same physical network, each phone can virtually connect to a separate phone line.

A problem occurs when one or more derived phone lines are available through a gateway in a packet data network, but users do not view the derived phone lines as a substitute for analog phone lines. For example, some derived phone lines, such as VoIP lines, are available that provide very low cost long-distance or international calling, but do not provide the quality of an analog phone line. Thus, it is desirable that the user using a phone should be able to make and accept calls on either the analog phone lines or the VoIP lines. For outgoing calls, the user may wish to decide whether to use the analog phone lines or VoIP lines depending on the destination of the call. Alternatively, the user can consider other factors such as cost and line utilization.

Therefore, what is needed is a technique for connecting a phone or other similar communication device to a packet data network employing the appropriate packet telephony protocols that also permit users to determine whether to use derived phone lines or analog phone lines.

SUMMARY OF THE INVENTION

A system for communicating signals in a packet telephony distribution system comprises a gateway coupled to a service provider for dynamically controlling communication to a plurality of communication devices and to a plurality of data network and analog lines, the plurality of communication devices being coupled to the gateway and configured to make outgoing calls and receive incoming calls via the plurality of data network and analog lines, and a plurality of adapters coupled to the gateway and further coupled to the plurality of communication devices, wherein one of each of the plurality of adapters is configured to dynamically select between a derived line and an analog line on the plurality of data network and analog lines.

A method for communicating analog or digital signals in a packet telephony distribution system, comprises the steps of configuring a gateway, receiving incoming calls from a plurality of data network and analog lines to a plurality of communication devices, selectively making outgoing calls on the plurality of data network and analog lines from the plurality of communication devices, and communicating signals to dynamically select between a derived line and an analog line on the plurality of data network and analog lines.

A system for communicating analog or digital signals in a packet telephony distribution system comprises means for dynamically controlling communication between a plurality of communication devices and a plurality of data network and analog lines, means for receiving incoming calls between a derived line and an analog line on the plurality of data network and analog lines, and means for selectively making outgoing calls between the derived line and the analog line on the plurality of data network and analog lines.

BRIEF DESCRIPTION OF THE DRAWINGS

FIG. 5 is a diagram illustrating one embodiment of a gateway configuration;

DETAILED DESCRIPTION OF THE INVENTION

Few communication devices such as cellular phones, facsimile machines, answering machines, or telephones (phones) exist today that are capable of directly connecting to a packet data network while providing analog phone service via a packet telephony distribution system. One technique to enable a communication device to connect to a packet telephony distribution system is to use an adapter. A phone can be used with a phone adapter that connects to a data network and an existing analog phone.

Figure 1A:
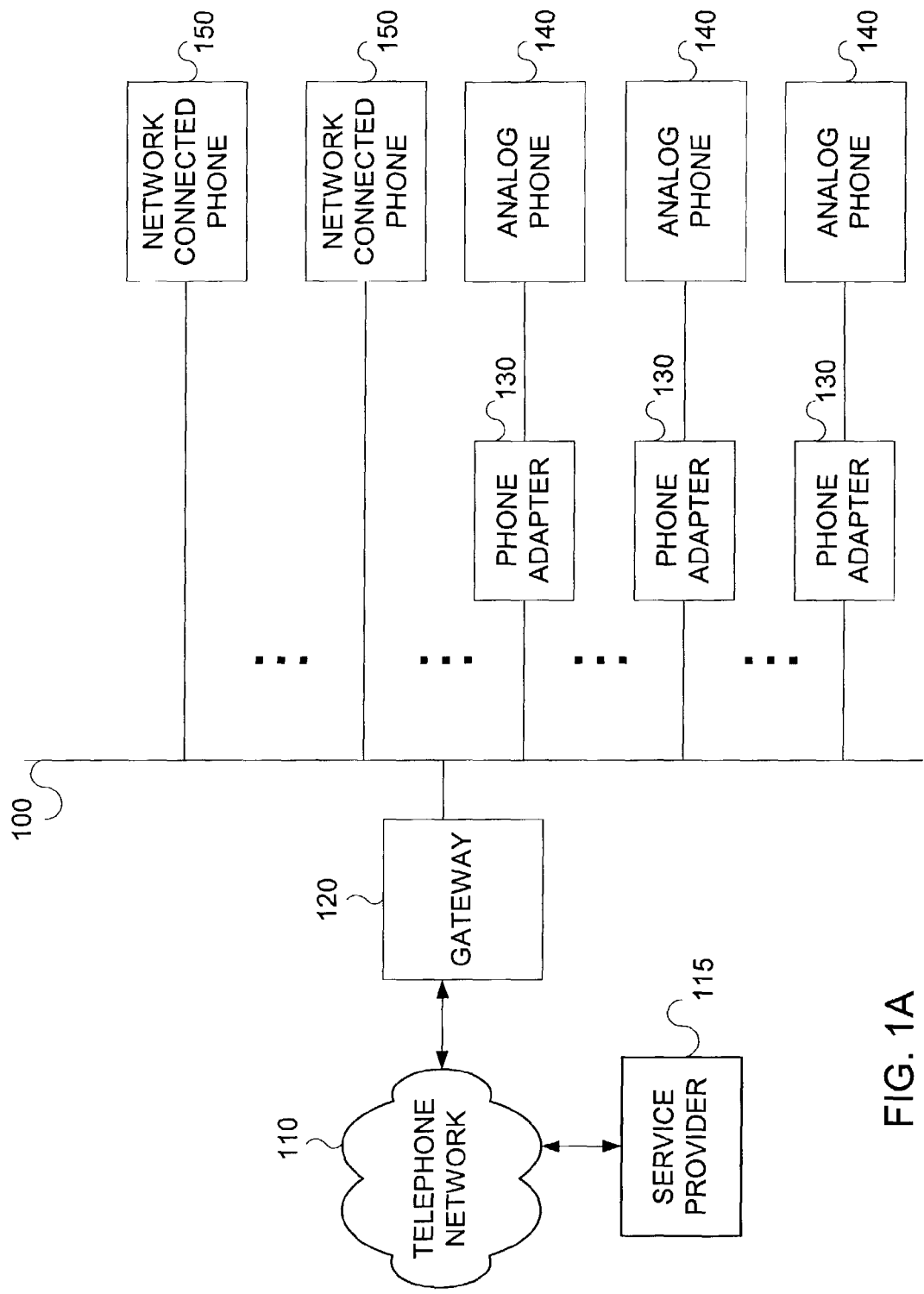
FIG. 1A is a diagram of one embodiment of a packet telephony distribution system in accordance with the invention.

FIG. 1A is a diagram of one embodiment of a packet telephony distribution system in accordance with the invention. A packet data network 100 is coupled to a telephone network 110 via at least one gateway 120. Packet data network 100 can have any network topology, such as a bus or ring, and can be wire-based or wireless. Derived phone lines and analog phone lines are available via telephone network 110, which are operated by a service provider 115, and are accessible to packet data network 100 through gateway 120. Telephone network 110 is coupled to service provider 115, which is coupled to a PSTN (Public Switched Telephone Network; not shown). PSTN includes central offices and other necessary networking equipment to provide telecommunication services. Further, service provider 115 can be a phone company, a cable TV company, or other competing organization. Gateway 120 can be any computer system or network device such as a bridge, router, or switch. Alternatively, gateway 120 can be a computer incorporating the functionality and hardware components of a network device.

Multiple analog phones 140 and network connected phones 150 are coupled to packet data network 100. Each analog phone 140 is coupled to a phone adapter 130, which provides networking and packet telephony capabilities. Network connected phones 150 include networking and packet telephony capabilities and do not require external phone adapters 130. Hereinafter, a phone refers to analog phone 140 coupled to phone adapter 130, network connected phone 150, or other communication device such as a cellular phone, facsimile machine, answering machine, or telephone.

In one embodiment, network connected phone 150 or phone adapter 130 in conjunction with analog phone 140, can be used for simultaneous calls over analog phone lines and derived phone lines, such as a packet telephony line. For example, a first user can make an outgoing call on an analog phone line. Simultaneously, a second user can receive an incoming call on a derived phone line. Further, other simultaneous incoming and outgoing calls can occur on any type of communication device connected to the packet telephony distribution system. When making or receiving calls, the call content can be voice, data, or messages via a common communication method. This embodiment also includes operations used in gateway 120 and in the communication devices, and protocols used between gateway 120 and the communication devices.

Figure 1B:
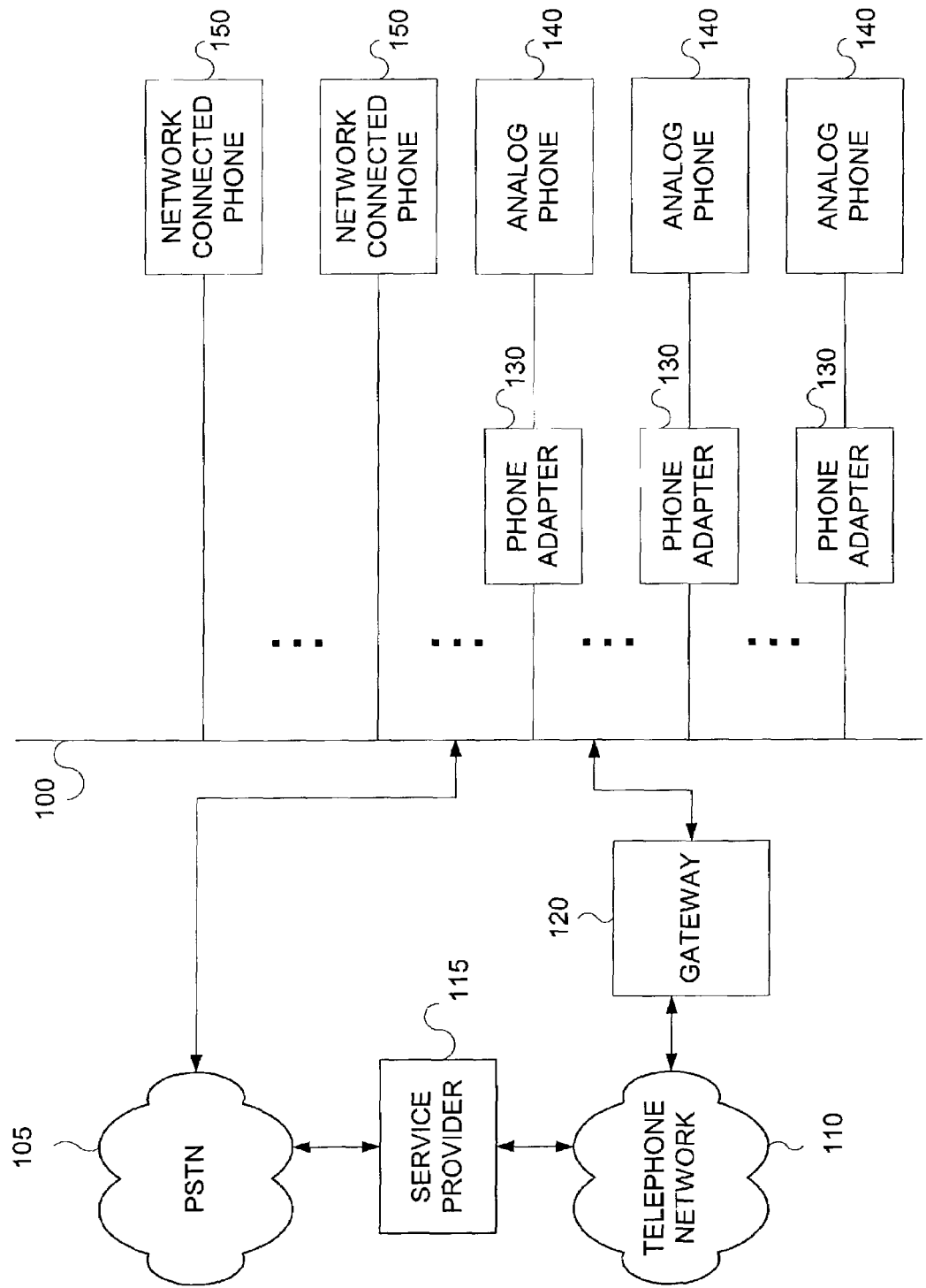
FIG. 1B is a diagram of another embodiment of a packet telephony distribution system in accordance with the invention.

FIG. 1B is a diagram of another embodiment of a packet telephony distribution system in accordance with the invention. In this embodiment, derived phone lines are accessible to packet data network 100 through gateway 120. Separately, analog phone lines are accessible to packet data network 100 via a PSTN 105. PSTN 105 is coupled to service provider 115, which can be a phone company, a cable TV company, or other competing organization. Therefore, multiple analog phones 140 and network connected phones 150 can access derived phone lines via gateway 120 and analog phone lines via PSTN 105.

Figure 2:
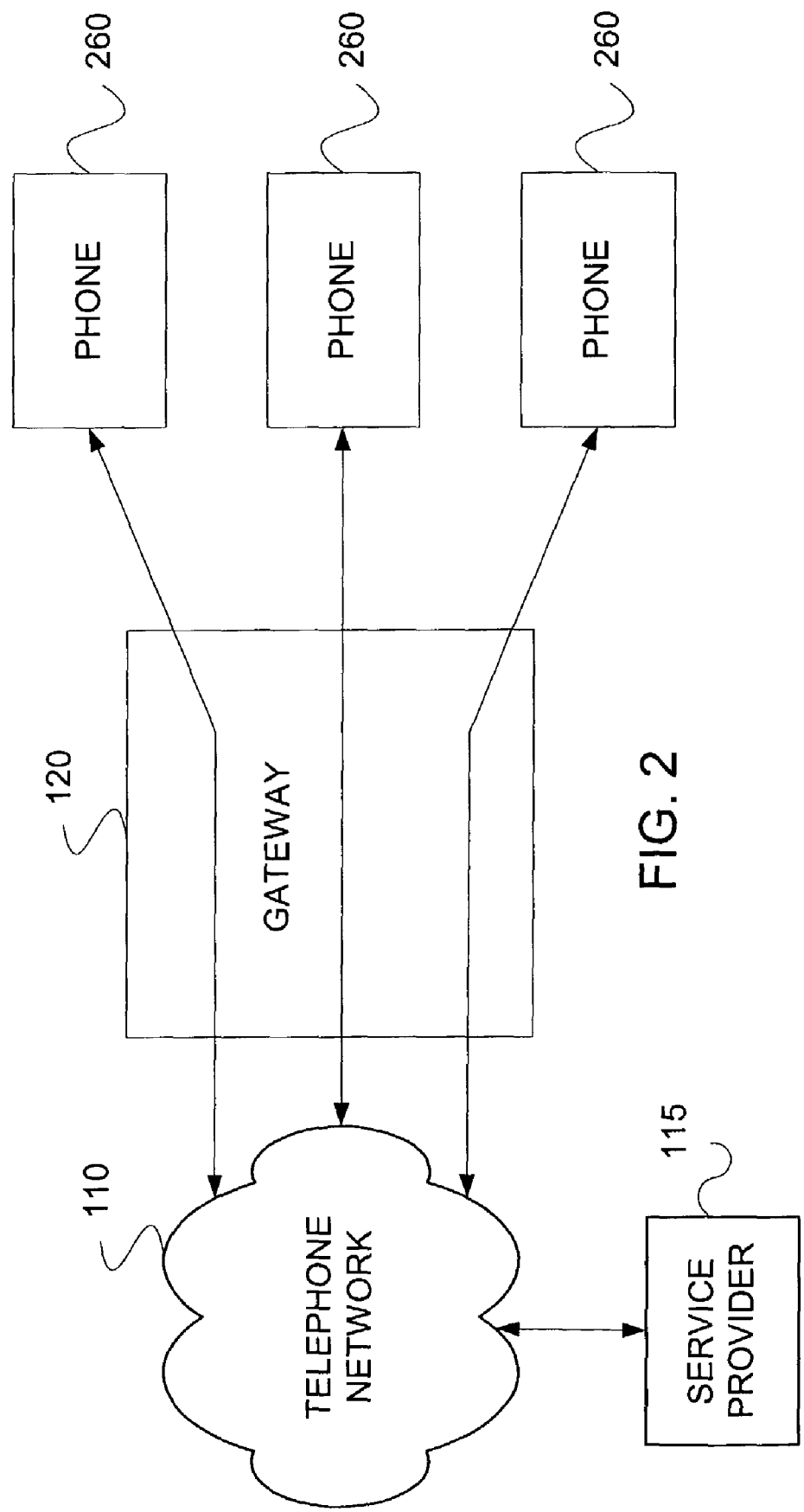
FIG. 2 is a diagram of another embodiment of a packet telephony distribution system.

FIG. 2 is a diagram of another packet telephony distribution system including telephone network 110 coupled to service provider 115 and further coupled to gateway 120 and phones 260. Phones 260 can either be analog phone 140 operating in conjunction with adapter 130 (FIG. 1B) or network connected phone 150 (FIG. 1B). Gateway 120 bridges telephone network 110 with phones 260 and provides virtual connections for voice, data, control, and signaling streams. Each phone 260 is physically coupled to packet data network 100 (FIG. 1B) via wires or wireless methods. For example, multiple phones 260 can be coupled to one copper wire-pair while accessing multiple virtual connections through gateway 120.

The system shown in FIG. 2 is appropriate if each phone 260 uses the same method that service provider 115 of telephone network 110 uses to share derived phone lines to an outside phone network. For example, phones 260 and service provider 115 of telephone network 110 can both use a VoIP standard such as SIP. In this example, gateway 120 can be an IP bridge or router.

Figure 3:
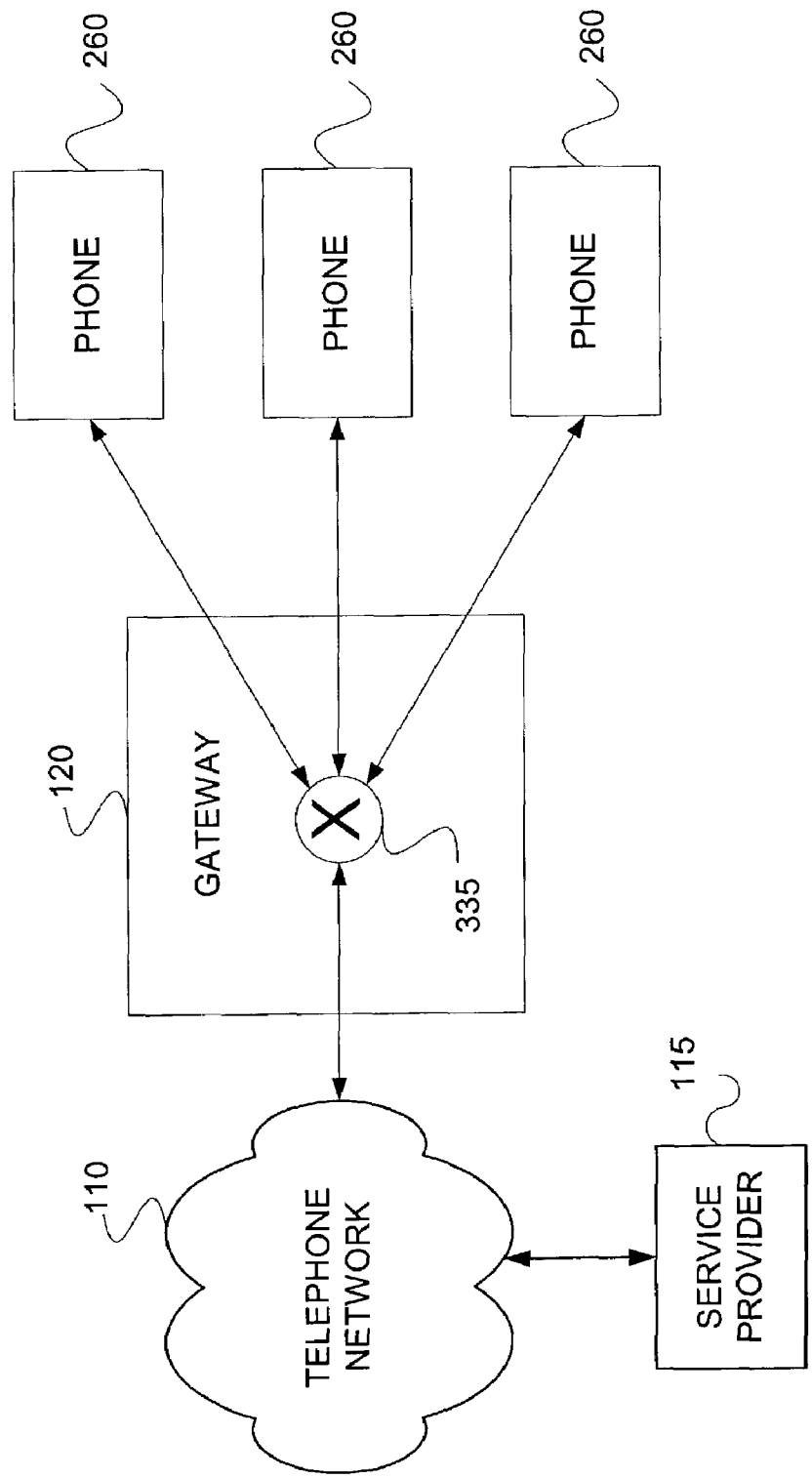
FIG. 3 is a diagram of another embodiment of a packet telephony distribution system in accordance with the invention.

FIG. 3 is a diagram of another embodiment of a packet telephony distribution system in accordance with the invention. Similar to the embodiment shown in FIG. 2, gateway 120 is coupled to telephone network 110 and phones 260. However, in this embodiment, gateway 120 includes a telephony switch 335 and can dynamically control which phones 260 are connected to which outside phone lines in telephone network 110. Each phone 260 can establish a separate connection to gateway 120 and the connection to telephone network 110 can include any number of phone lines. Further, telephone network 110 need not use the same technology used by phones 260. For example, telephone network 110 can be analog phone lines or phone lines carried over cable TV wires, while phones 260 can use HomePNA.

Telephony switch 335 permits gateway 120 to control the operation of phones 260 via signaling protocols between gateway 120 and phones 260. Exemplary signaling protocols are MGCP and ITU-T H.248/Megaco. Functions of the signaling protocol include hook-state transitions, which determines whether phone 260 is on hook or off hook, and ring signaling. In this embodiment, the signaling protocols used between gateway 120 and phones 260 are independent of the signaling protocols used to connect gateway 120 to the outside phone lines in telephone network 110.

Figure 4:
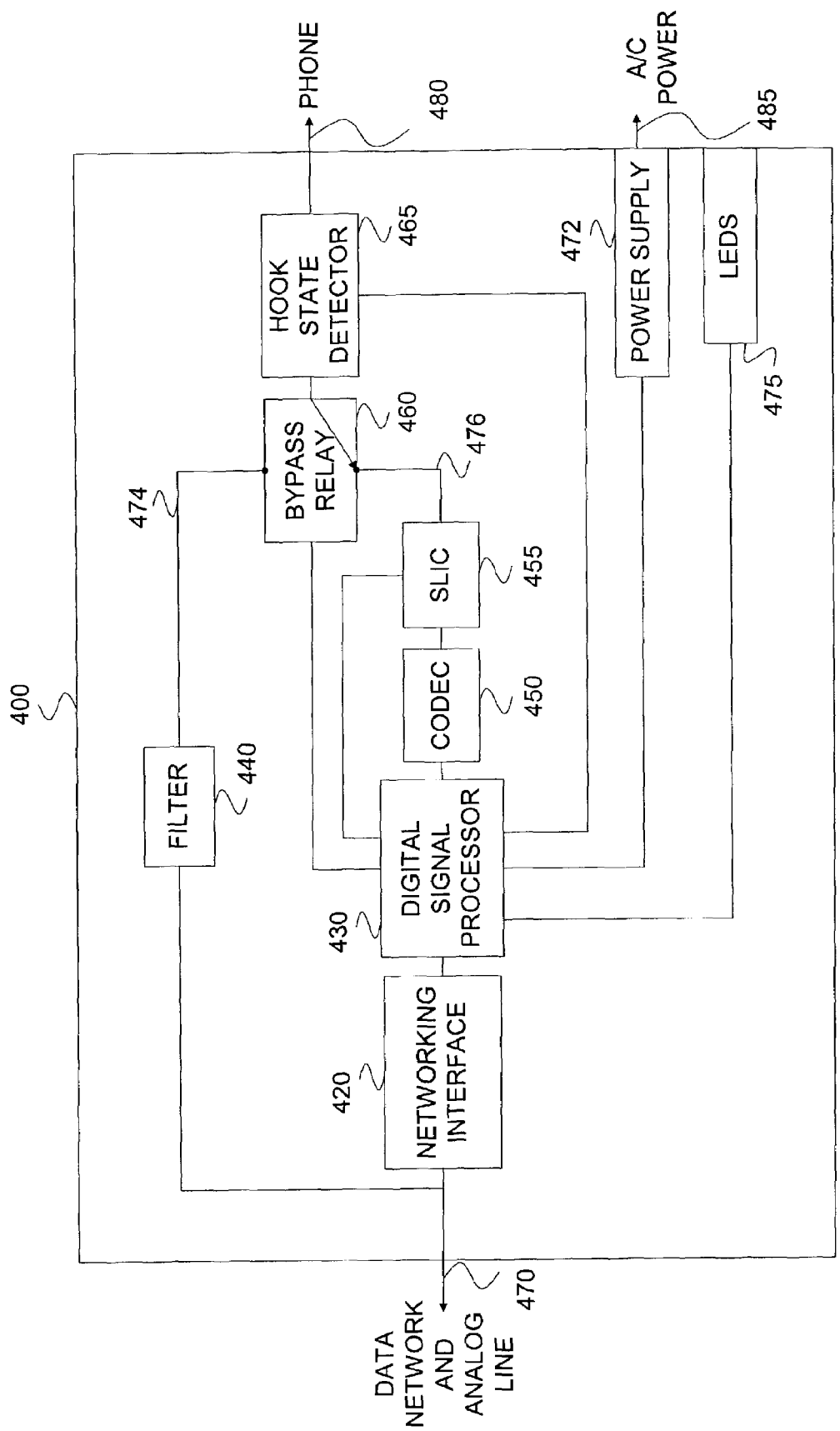
FIG. 4 is a diagram of an embodiment of a dual-use packet/analog phone adapter in accordance with the invention.

FIG. 4 is a diagram of an embodiment of a dual-use packet/analog phone adapter in accordance with the invention. In the FIG. 4 embodiment, an adapter 400 is implemented as phone adapter 130 (FIG. 1A). In another embodiment, adapter 400 is implemented as part of network connected phone 150 (FIG. 1A). Adapter 400 is shown with two communication paths. A first communication path 470 provides a path to gateway 120 and a path to the analog phone line. A second communication path 480 provides a path to analog phone 140 (FIG. 1A) or a similar communication device.

For communicating on first communication path 470, adapter 400 includes a component, such as a networking interface 420, to implement a protocol, such as HomePNA, to communicate digitized voice and call-control signaling. For communicating on second communication path 480, adapter 400 can emulate a connection to an analog phone line.

Adapter 400 includes a power supply 472 that is coupled to an A/C power supply (not shown) via a path 485. Information is displayed via LEDs 475, which are controlled by a digital signal processor 430. Networking interface 420 is coupled to gateway 120 via first communication path 470 and is further coupled to digital signal processor 430. Digital signal processor 430 is also coupled to a codec 450, a SLIC (Subscriber Line Interface Circuit) 455, a bypass relay 460, and a hook state detector 465.

The primary functions of digital signal processor 430 are processing packet telephony signals and data. Digital signal processor 430 also controls SLIC 455 and bypass relay 460. Networking interface 420 functions according to the HomePNA, HomePlug, HomeRF, or other networking standard. Further, when the derived phone line and the analog phone line share the same copper wire-pair, such as in HPNA, networking interface 420 can distinguish between data packets and analog signals. Codec 450 is further coupled to SLIC 455, which is coupled to bypass relay 460. Typically, codec 450 has the functionality of a standard off-the-shelf coder/decoder and SLIC 455 performs electrical signaling, such as monitoring voltage levels and ring generation.

Bypass relay 460 is coupled to a filter 440, which is coupled to gateway 120 via first communication path 470. Filter 440 is configured to pass only POTS band signals to a path 474.

Bypass relay 460 is configured to couple hook state detector 465 to path 474 or to a path 476 according to control signals from digital signal processor 430. Bypass relay is in a "bypass on" state when it couples hook state detector 465 with path 474. Bypass relay 460 couples hook state detector 465 to path 474 to allow the communication device coupled to path 480 to transmit and receive POTS signals to and from an analog phone line in telephone network 110 (FIG. 1A). Bypass relay 460 is in a "bypass off" state when it couples hook state detector 465 with path 476. Bypass relay 460 couples hook state detector 465 to path 476 to allow the communication device to communicate with telephone network 110 using packet telephony signals and data. Other equivalent relay arrangements, such as adding multiple bypass relays 460, are possible to switch between the analog phone line and the packet telephony line.

The default condition for phones 260 can be the bypass on state to accept analog incoming calls. During the bypass on state, an incoming call from the analog phone line to phone 260 bypasses networking interface 420, and signals phone 260 with analog ring signaling. If the user of phone 260 answers phone 260, adapter 400 indicates the transition to the off hook state to gateway 120 using hook state detector 465. Subsequent incoming calls that can cause gateway 120 to switch the bypass state of adapter 400 will not occur as long as phone 260 stays off hook. If phone 260 is off hook for an operation, such as an outgoing call, then when phone 260 is again on hook, adapter 400 signals gateway 120 accordingly, and subsequent incoming calls to phone 260 can result in a change of the bypass state.

An important feature of the bypass state, using bypass relay 460, is used if there is a power-loss, or if communication to gateway 120 is lost. During the power loss, the default condition ensures bypass relay 460 is in the bypass on state. Therefore, the analog phone line is available for use. Further, during the communication loss, digital signal processor 430 can keep bypass relay 460 in the bypass on state until adapter 400 establishes communication with gateway 120. If bypass relay 460 is in the bypass off state, then digital signal processor 430 can continually monitor communication to gateway 120, and switch bypass relay 460 to the bypass on state if communication with gateway 120 ever ceases. Such monitoring may be via a periodic keep-alive message from gateway 120. In place of digital signal processor 430, other components can be used to monitor communication with gateway 120.

Hook state detector 465 is configured to detect the hook state of the communication device coupled to second communication path 480. In this embodiment, hook state detector 465 measures a loop current in the connection to the communication device coupled to second communication path 480. If the loop current is flowing, then the communication device coupled to second communication path 480 is off hook. Other embodiments are possible that vary the components and component interconnections of adapter 400 without departing from the spirit of the invention. For example, an equivalent adapter 400 in network connected phone 150 includes similar components, with the exception of second communication path 480.

FIG. 5 is a diagram illustrating one embodiment of a gateway configuration. A gateway table 520 stored in gateway 120 (FIG. 1A) is configured to associate each phone 260 (FIG. 2) with one or more data network and analog lines on telephone network 110 (FIG. 1A), such that incoming calls on the data network and analog lines ring the appropriate phone 260. An exemplary configuration includes a unique phone name 530, a unique address 540, a caller ID 550, a time of day 560 identifier, a day of week 570 identifier, or other identifier 580. A variety of methods exist to configure the associations and rules that ring a particular phone 260. One configuration method can be via physical switches on gateway 120. Other configuration methods include using a web interface to gateway 120 or configuration control software. The web interface and configuration control software can operate on gateway 120 or on a computer (not shown) coupled to the packet telephony distribution system.

Operations such as incoming and outgoing calls use the associations stored in gateway table 520 to communicate any combination of voice, data, facsimile transmissions, or any other means of communication, from the data network and analog line to the communication device. In order to support the operations, a communication protocol between phones 260 and gateway 120 includes a method to communicate a bypass state to phone 260. In one embodiment, gateway 120 communicates the bypass state to and from phone 260 via message signals. Exemplary message signals are a bypass on state and a bypass off state. The bypass on state indicates a connection to the analog phone line and the bypass off state indicates a connection to the derived phone line, or the packet telephony line. Alternatively, in other embodiments, the bypass states can be reversed to indicate the bypass on state for the packet telephony line and the bypass off state for the analog phone line.

Adapter 400 processes the message signals. However, message signals can be lost in transit. Therefore, the communication protocol must also be reliable. Three methods to ensure reliability are message retransmission, message repetition, and reliable transport protocol. In message retransmission, a message receiver transmits a return message to acknowledge the receipt of each message. If a message sender does not receive an acknowledgement within a designated time-out period, the message sender retransmits the message. A sequence number, or other equivalent identifier, can be used to permit a message receiver to distinguish a new message from a retransmitted message.

In message repetition, a message sender periodically retransmits messages in the event that one of the messages is lost. Similar to message retransmission, a sequence number, or other equivalent identifier, can be used to permit the message receiver to distinguish a new message from a retransmitted one. However, in message repetition, the retransmission time period can vary. Finally, in reliable transport protocol, the message can be sent using a reliable network transport protocol, such as TCP (Transmission Control Protocol).

Figure 6:
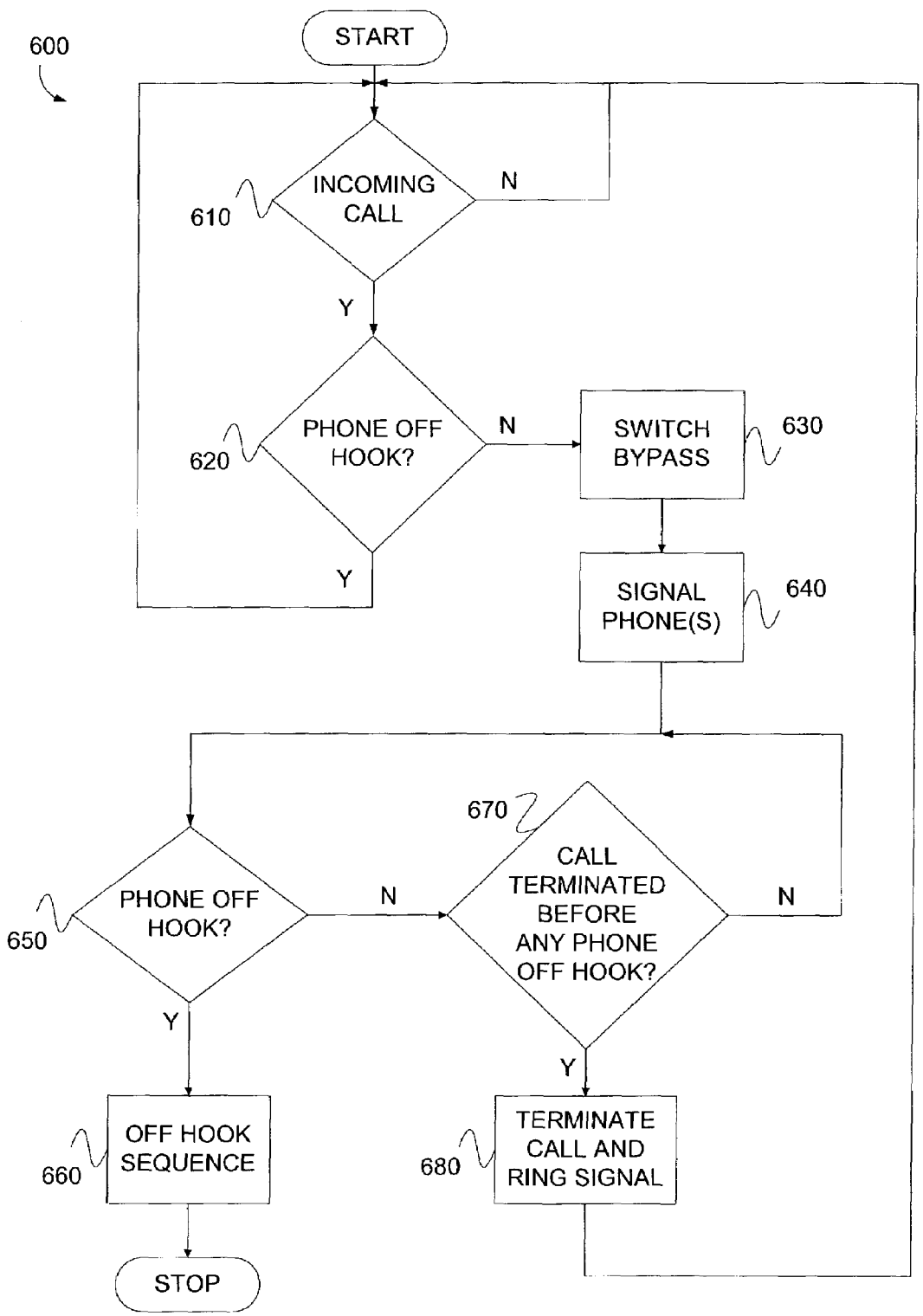
FIG. 6 is a flowchart of method steps for receiving an incoming call in accordance with one embodiment of the invention.

FIG. 6 is a flowchart 600 of method steps for receiving an incoming call in accordance with one embodiment of the invention. In step 610, gateway 120 (FIG. 1B) determines if there is an incoming call from telephone network 110 (FIG. 1B). For a packet telephony line, the signal is typically a message, and is forwarded to adapter 400 (FIG. 4). On adapter 400, networking interface 420 (FIG. 4) detects a message signal. For an analog phone line, which receives an incoming call from PSTN 105 (FIG. 1B), the signal is a ring signal, which is typically an AC voltage of a defined amplitude and frequency. An incoming call from the analog phone line to phone 260 (FIG. 2) bypasses networking interface 420 when bypass relay 460 (FIG. 4) is in the bypass on state. If there is no incoming call from telephone network 110, then gateway 120 waits until a message arrives. If there is an incoming call from telephone network 110, then the next step occurs in step 620.

In step 620, if any phone 260 is off hook, then gateway 120 continues to receive the incoming call message signal. If no phone 260 is off hook, then in step 630, gateway 120 transmits a message signal to phone 260 to switch the bypass state, ensuring the bypass off state. Gateway 120 first determines the hook state of phone 260 using hook state detector 465 (FIG. 4) to signal the appropriate phone 260. Typically, this can be done by determining whether the most recently received hook state indication, using hook state detector 465, from phone 260 indicates an on hook or off hook condition. Alternatively, software protocols operating on gateway 120 can actively query phone 260 to determine the hook state. If phone 260 is off hook, then gateway 120 should make no attempt to ring phone 260 or switch the bypass state because phone 260 may be using the analog phone line. Therefore, if phone 260 is on hook, then gateway 120 ensures that phone 260 is not in the bypass on state by sending a message signal to phone 260 indicating that adapter 400 should switch to the bypass off state. If gateway 120 has prior knowledge that gateway 120 had already set phone 260 into the bypass off state, the message signal need not be sent again.

Subsequently, in step 640, gateway 120 signals each phone 260 mapped to the appropriate data network and analog line to ring. Depending on the protocol used between gateway 120 and phones 260, a ring indication to phones 260 can be an incoming call signal or a ring control signal. An incoming call signal indicates an incoming call condition when the incoming call signal is first received. The incoming call condition terminates if a user of phone 260 answers the incoming call or if the incoming call terminates. During the incoming call signal, phone 260 determines the ring cadence. An alternative ring indication is the ring control signal, which indicates when a phone 260 ringer should be on or off. During the ring control signal, the incoming call signal causes gateway 120 to generate a sequence of ringer on and ringer off signals to phone 260, resulting in a specific ring cadence. The ring cadence is controlled by gateway 120. The ring cadence may or may not match a ring cadence signaled by the data network and analog line.

Next, in step 650, if any phone 260 is taken off hook during an incoming call, phone 260 signals gateway 120 that it is off hook, and the following off hook sequence in step 660 occurs. In step 660, gateway 120 terminates the incoming call or ring signaling to all phones 260 mapped to the data network and analog line by indicating the no-incoming-call, or ringer-off condition. Then, gateway 120 signals phones 260 mapped to the data network and analog line that the line is in use. Next, gateway 120 indicates to the data network and analog line that phone 260 is off hook and establishes a bi-directional data stream to and from the off hook phone 260. Gateway 120 then establishes a bi-directional data stream to and from the outside phone line and connects the two data streams together, permitting the data stream from the phone line to pass to phone 260. In other embodiments (not shown), the incoming call can be directed to a recording device or an answering service to answer the call, in lieu of the user. However, once the user answers the incoming call, the incoming call operation ends.

If no phone 260 is taken off hook during an incoming call, then in step 670, gateway 120 determines whether the incoming call terminates before any phone 260 has gone off hook. If the incoming call terminates, then in step 680, gateway 120 terminates the incoming call to all phones 260 mapped to that line and terminates ring signaling. Specifically, gateway 120 indicates a no-incoming-call or ringer-off condition. Alternatively in step 670, if the incoming call does not terminate before any phone 260 has gone off hook, then gateway 120 permits the incoming call message signal to continue.

Figure 7:
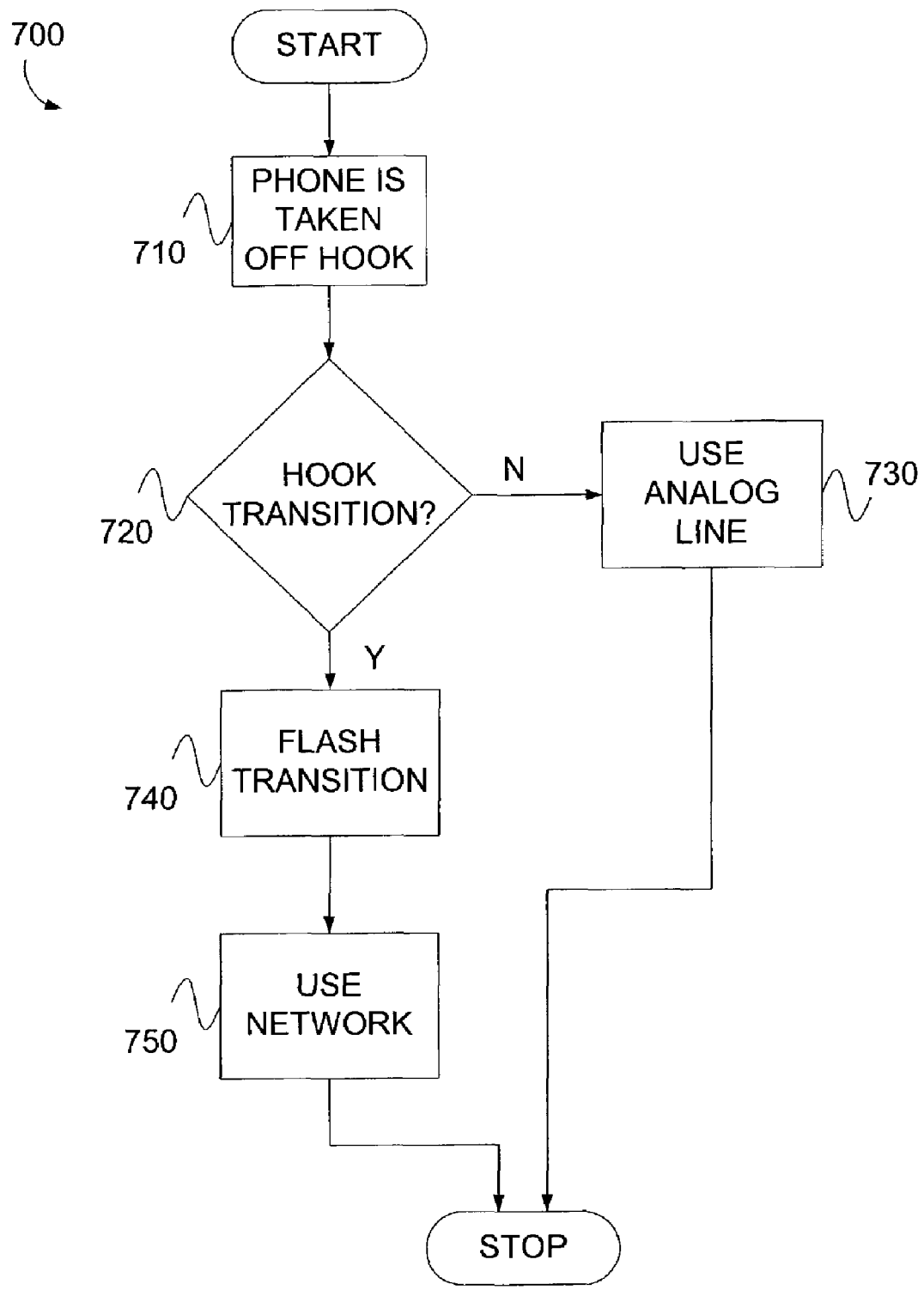
FIG. 7 is a flowchart of method steps for transmitting outgoing calls in accordance with one embodiment of the invention.

FIG. 7 is a flowchart 700 of method steps for transmitting outgoing calls in accordance with one embodiment of the invention. In step 710, when phone 260 (FIG. 2) is taken off hook, the off hook condition is transmitted by phone 260, using hook state detector 465 (FIG. 4) to gateway 120 (FIG. 1A). Then, in step 720, gateway 120 determines whether a subsequent hook transition occurs during a timed interval, such as 10 seconds. If no hook transition occurs, then in step 730, no further action is taken by gateway 120, and phone 260 stays in the bypass on state. While in the bypass on state, an audible dial tone indicates the availability of the analog phone line and phone 260 permits the user to use the analog phone line to dial a call.

However, if a hook transition occurs, then in step 740, gateway 120 waits for a flash transition. The flash transition is an on hook condition rapidly followed by an off hook transition and occurs within 1 second from each other. If gateway 120 detects a flash transition within a defined interval after the initial off hook condition, then gateway 120 interprets this as an indication to switch phone 260, using bypass relay 460 (FIG. 4), to a gateway 120 provided line, such as the packet telephony line.

Other communication devices can include other methods of line selection, which can result in explicit line selection signaling to gateway 120. For example, mechanical controls on phone 260 can perform line selection. In another embodiment (not shown), gateway 120 can require additional input from the user to select the desired line for a connection. For example, gateway 120 can use DTMF (Dual Tone Multi-Frequency) signaling, permitting the user to enter the number of the data networking and analog phone line for a connection. This may include a voice prompt providing instructions to the user on how to make this selection.

In step 750, after the flash transition, gateway 120 signals phone 260 to switch from the bypass on state to the bypass off state. Then gateway 120 sends a signal to all phones 260 mapped to the packet telephony line indicating that the line is in use and also signals the packet telephony line that the line is off hook. In this embodiment, the outgoing call operation ends when the user makes an outgoing call.

In addition to the operations and protocols previously described between gateway 120 and adapter 400, signals that conform to a signaling protocol can be implemented. Depending on the type of data networking and analog line, exemplary signals include a message to a packet telephony line or a voltage drop on the analog phone line. Typically, the data networking and analog line responds to the off hook condition by indicating a dial tone. The dial tone can be an actual audio tone or a message. If the dial tone is generated by telephone network 110 (FIG. 1A) and is sent to gateway 120 as an audio tone, then gateway 120 establishes a bi-directional data stream to and from phone 260, establishes a bi-directional data stream to and from the data networking and analog line, and connects the two data streams together, permitting the dial tone to pass to phone 260. If the dial tone is sent to gateway 120 as a message, then gateway 120 or adapter 400 can generate the dial tone. If the dial tone is generated by gateway 120, then gateway 120 establishes a data stream to phone 260 and sends the dial tone to phone 260. However, if adapter 400 generates the dial tone, then gateway 120 sends the dial tone via a message to adapter 400 and adapter 400 generates the dial tone.

The invention has been explained above with reference to specific embodiments. Other embodiments will be apparent to those skilled in the art in light of this disclosure. The present invention may readily be implemented using configurations other than those described in the embodiments above. Additionally, the present invention may effectively be used in conjunction with systems other than the one described above. Therefore, these and other variations upon the above embodiments are intended to be covered by the present invention, which is limited only by the appended claims.

What is claimed is:

1. A system for communicating signals in a packet telephony distribution system comprising:

a gateway coupled to a service provider for dynamically controlling communication to a plurality of communication devices and to a plurality of data network and analog lines, the plurality of communication devices being coupled to the gateway and configured to make outgoing calls and receive incoming calls via the plurality of data network and analog lines; and a plurality of adapters coupled to the gateway and further coupled to the plurality of communication devices, wherein one of each of the plurality of adapters is configured to dynamically select between a derived line and an analog line on the plurality of data network and analog lines;

wherein each of the plurality of adapters comprises:

a networking interface coupled to the plurality of data network and analog lines, the networking interface configured to operate according to a networking standard;

a digital signal processor coupled to the networking interface, the digital signal processor configured to process telephony signals and streaming audio;

a codec coupled to the digital signal processor;

a SLIC coupled to the codec and further coupled to the digital signal processor for electrical signaling on the plurality of data network and analog lines;

a bypass relay coupled to the data networking and analog lines and further coupled to the SLIC and the digital signal processor wherein the bypass relay switches access between the derived line and the analog line on the plurality of data network and analog lines; and a hook state detector coupled to the communication device and the digital signal processor for determining the hook state of the communication device.

2. The system of claim 1, wherein the telephone network is operated by a
service provider.

3. The system of claim 1, wherein the gateway includes a network device for
dynamic control of communication between the plurality of communication devices and the plurality of data network and analog lines.

4. The system of claim 1, wherein the gateway further communicates control signals to the plurality of adapters to dynamically select between the derived line and the analog line on the plurality of data network and analog lines.

5. The system of claim 1, wherein one of each of the plurality of communication devices is uniquely coupled to one of each of the plurality of adapters.

6. The system of claim 1, wherein the gateway is configured to uniquely identify each of the plurality of communication devices to make outgoing calls and receive incoming calls.

7. The system of claim 1, wherein the networking standard is HomePNA, HomePlug, or HomeRF.

8. The system of claim 1, wherein the hook state detector measures a loop current while coupled to one of the plurality of communication devices to determine an off hook condition.

9. The system of claim 1, wherein the bypass relay alternates between a bypass on state and a bypass off state to select between the derived line and the analog line on the plurality of data network and analog lines.

10. The system of claim 1, wherein a filter is coupled to the bypass relay to filter digital signals on the plurality of data network and analog lines.

11. An adapter to facilitate communications over a derived line and an analog line, the adapter comprising:
- a networking interface coupled to a plurality of data network and analog lines, the networking interface configured to operate according to a networking standard;
- a digital signal processor coupled to the networking interface, the digital signal processor configured to process telephony signals and streaming audio;
- a codec coupled to the digital signal processor;
- a subscriber line interface circuit (SLIC) coupled to the codec and further coupled to the digital signal processor for electrical signaling on the plurality of data network and analog lines;
- a bypass relay coupled to the data networking and analog lines and further coupled to the SLIC and the digital signal processor, the bypass relay configured to switch access between the derived line and the analog line on the plurality of data network and analog lines; and
- a hook state detector coupled to the communication device and the digital signal processor, the hook state device configured to determine the hook state of the communication device.

12. The adapter of claim 11, wherein the networking standard is HomePNA, HomePlug, or HomeRF.

13. The adapter of claim 11, wherein the hook state detector is further configured to measure a loop current while coupled to one of the plurality of communication devices to determine an off hook condition.

14. The adapter of claim 11, wherein the digital signal processor is further configured to perform an off hook sequence during an incoming call to dynamically select between the derived line and the analog line on the plurality of data network and analog lines.

15. The adapter of claim 11, wherein the bypass relay is further configured to alternate between a bypass on state and a bypass off state to select between the derived line and the analog line on the plurality of data network and analog lines.

16. The adapter of claim 15, wherein the bypass relay is further configured to switch to the bypass off state to facilitate a communication over the derived line.

17. The adapter of claim 15, wherein the bypass relay is further configured to switch to the bypass on state to facilitate a communication over the analog line.

18. The adapter of claim 15, wherein the bypass relay is further configured to switch by default to the bypass on state during a power loss to enable communication over the analog line.

19. The adapter of claim 11, wherein a filter is coupled to the bypass relay to filter digital signals on the plurality of data network and analog lines.

20. The adapter of claim 11, further comprising a light emitting diode (LED) coupled to the digital signal processor, wherein the digital signal processor is further configured to control the LED to display information.

21. The adapter of claim 11, wherein the networking interface is further configured to receive a message signal from a gateway to switch the bypass relay unless the gateway has prior knowledge of switching the bypass relay.

* * * * *